April 30, 1963  J. J. STONE, JR  3,087,987
SCANNER SYSTEM
Filed Feb. 15, 1960
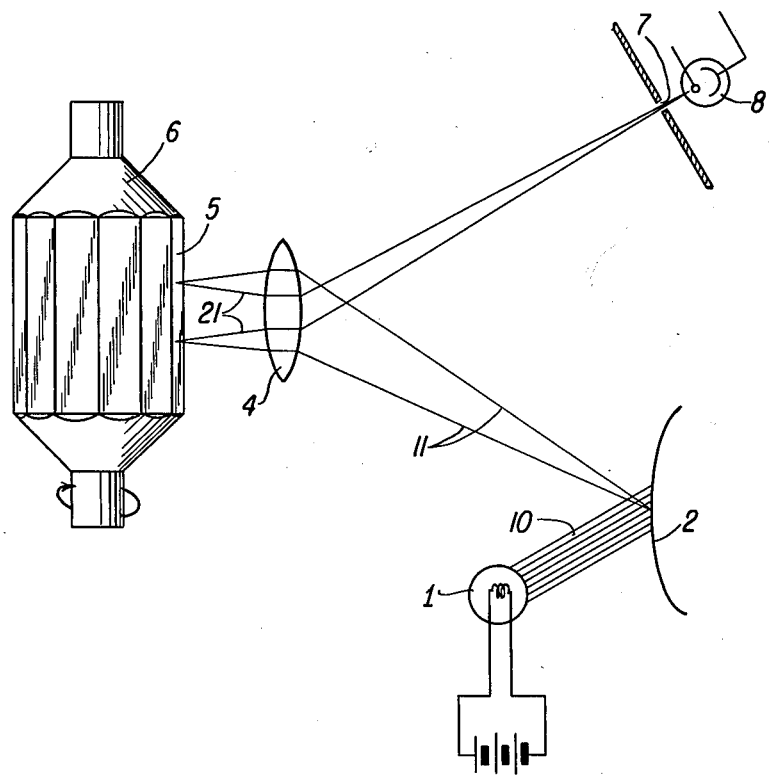
INVENTOR.
Joseph James Stone Jr.
BY
Ooms, McDougald, Williams & Hersh
Attys.

3,087,987
SCANNER SYSTEM
Joseph James Stone, Jr., Glenview, Ill., assignor to A. B. Dick Company, Niles, Ill., a corporation of Illinois
Filed Feb. 15, 1960, Ser. No. 8,653
2 Claims. (Cl. 178—7.6)

The present invention relates in general to a scanning arrangement and more particularly relates to a flying spot scanner system in which the necessity for light tight operation is eliminated.

In previous flying spot scanner systems, light emitted through a small aperture into a light tight compartment is focused by an optical system comprising a lens and rotating mirror on respective portions of an object of which an image is to be formed. The light reflected from the respective portions of the object or copy is directed to an appropriately positioned photo pick-up or light sensitive means for providing an image of the object. Such a system being operated in a light tight compartment is difficult to adjust and repair, while replacement of any of the parts is difficult, time consuming and expensive. In addition, limitations are imposed on the copy size and design of components.

By seizing on the technique of flooding the copy with a powerful light, which differentiates the copy from the general background light, the applicant realized that it is possible to eliminate those difficulties through simple reversal of the scanning system. Thus the conventional optical system, including the lens and the rotating mirror, focuses the reflected bright light from respective portions of the copy through the small aperture behind which the light sensitive apparatus is located.

This eliminates the need for maintaining the copy, lens and mirror in a light tight compartment and, therefore, permits easy access thereto for overcoming the discussed problems.

It is, therefore, an object of the present invention to provide a flying spot scanner arrangement which is operable in a normally lighted background.

It is another object of the present invention to provide a more economical flying spot scanning arrangement in which adjustments, repairs, replacements are easily made and in which restrictions on the size and design of the copy and components are largely eliminated.

Other objects and features of this invention will become apparent on the reading of the following specification and claims in conjunction with the drawing.

Referring to the drawing, it will be seen that the scanning system of the present invention comprises a light source 1, which floods an object 2 to be copied. The light reflected from the copy is focused by a conventional scanning optical system comprising a lens 4, and a rotating mirror arrangement 6. The rotating mirror arrangement comprises a plurality of mirrors 5, displaced along the periphery of a rotating holder therefor, which is constructed and operated in a conventional manner.

As each mirror 5 rotates it reflects different portions of the copy toward an aperture 7, behind which is located a conventional light responsive apparatus 8. The light responsive means which may comprise a photo cell, for example, is conventionally controlled by the reflected light to provide an image of the scanned copy.

In brief, the light source 1 floods the copy 2 with intense light, as indicated by the beam 10. Respective portions of the copy 2 modulate this light and reflect the modulated light, indicated by rays 11, through the objective lens 4, which directs the light toward one of the adjacent rotating mirrors 5.

As the mirror 5 rotates it reflects light, indicated by rays 21, from various portions of the copy back through the lens 4 and these light rays are passed through the aperture 7 to control the photo sensitive light apparatus 8, in accordance with the variations in light reflected from copy 2.

Thus it will be seen that the present invention eliminates the need for a light tight comparemtnt and thereby creates easier service and adjustment conditions while permitting subject matter of increased size to be more easily reproduced and eliminates a number of design restrictions imposed by operating the system in a light tight compartment.

Although I have described but one embodiment of my invention, I believe the invention capable of broad and varied use and application and am, therefore, appending hereto a series of claims which are believed to cover the disclosed inventive concepts.

I claim:
1. A flying spot scanning system of the type wherein a plurality of rotating mirrors and an objective lens are located to direct light from an object toward a photo responsive means for producing an image of the object, the improvement comprising means for exposing said object, mirrors and lens to a general background light, and means for directing an intense light at said object whereby said object modulates said intense light and reflects said intense light toward said lens and then to said rotating mirrors, said lens being located whereby said modulated light is then reflected from said mirrors back through said lens and to said light responsive means.

2. In a scanning system for scanning an object which includes a photo responsive means for producing an image of the object, an aperture disposed adjacent said photo responsive means for transmission of light thereto, a lens for transmission of light to said aperture and rotating mirrors for reflecting light transmitted from said object, the improvement comprising means for exposing said object, mirrors and lens to a general background light, means positioned adjacent said object for directing an intense light directly at said object whereby said object will modulate said intense light and reflect said intense light directly toward said lens and then to said rotating mirrors, said lens being located whereby said modulated light is then reflected from said mirrors back through said lens and to said light responsive means.

References Cited in the file of this patent

UNITED STATES PATENTS

| | | |
|---|---|---|
| 2,163,543 | Clothier | June 20, 1939 |
| 2,169,654 | Maguire | Aug. 15, 1939 |
| 2,192,376 | Harding | Mar. 5, 1940 |
| 2,262,584 | Herriott | Nov. 11, 1941 |
| 2,366,194 | Kaiser | Jan. 2, 1945 |
| 2,578,307 | Hunt | Dec. 11, 1951 |
| 2,976,361 | Stamps | Mar. 21, 1961 |